(No Model.)
A. H. ATWOOD.
Photographic Printing Frame.
No. 240,001.   Patented April 12, 1881.
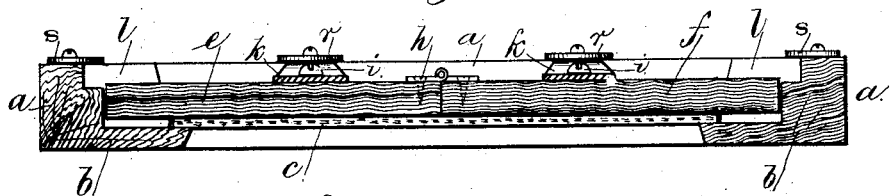
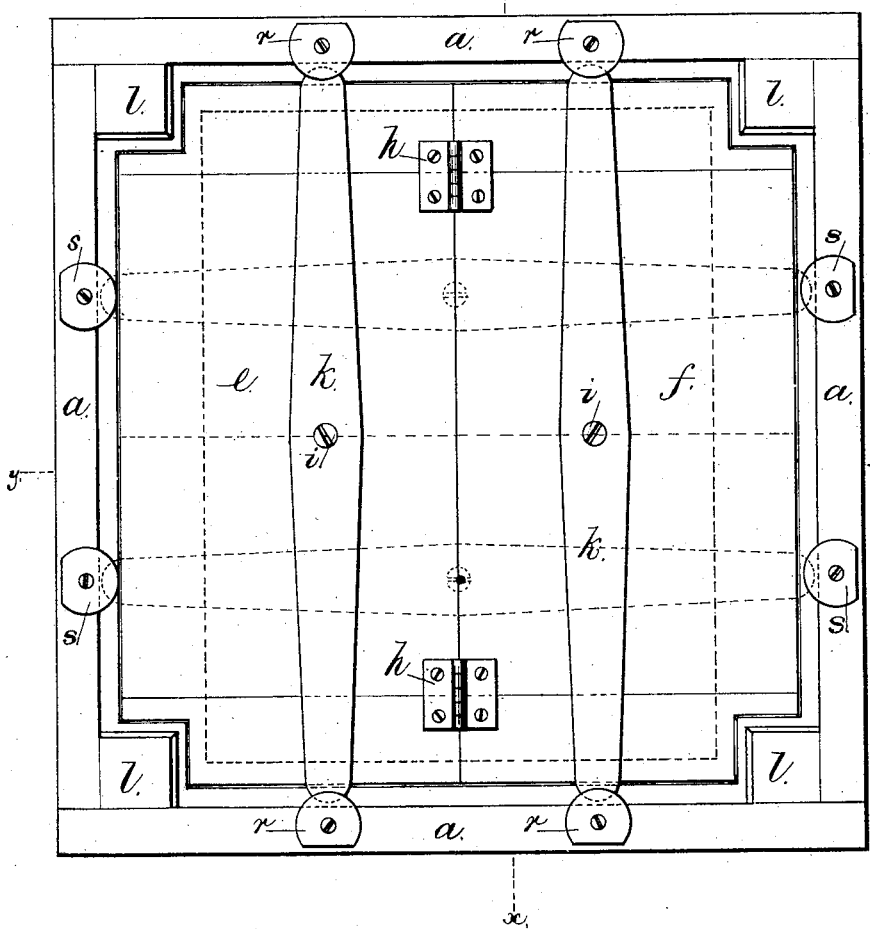
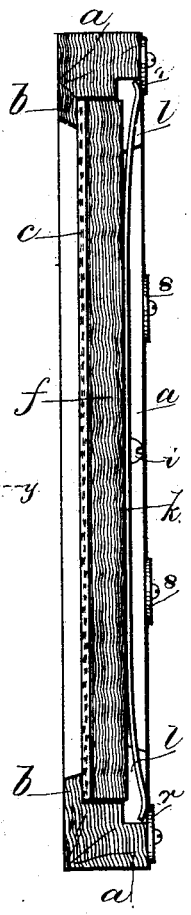
Witnesses
Harold Serrell
J. Haib
Inventor
Abiathar H. Atwood
per Lemuel W. Serrell
Atty.

UNITED STATES PATENT OFFICE.

ABIATHAR H. ATWOOD, OF NEW YORK, N. Y., ASSIGNOR TO SCOVILL MANUFACTURING COMPANY, OF WATERBURY, CONN.

PHOTOGRAPHIC-PRINTING FRAME.

SPECIFICATION forming part of Letters Patent No. 240,001, dated April 12, 1881.

Application filed February 14, 1881. (No model.)

*To all whom it may concern:*

Be it known that I, ABIATHAR H. ATWOOD, of the city and State of New York, have invented an Improvement in Photographic-Printing Frames, of which the following is a specification.

Photographic-printing frames have been made with the two-part back hinged together and held into the frame by springs that catch at the ends beneath buttons, so that when one spring is released the half-portion of the back can be swung open to examine the picture. In some of these printing-frames the division of the back is lengthwise of the glass negative, so that the top and bottom portions of the picture can be examined at the same time, and this division has sometimes been central, and at other times at one side of the central line. In other frames the division of the back has been across the shortest length of the glass, so that the top or bottom of the picture could be examined. These different kinds of photograph-frames have rendered it necessary for the photographer to have a large number of printing-frames, so as to make use of whichever one was best adapted to the particular kind of picture that was being printed, in order that the various parts of the picture might be compared and the proper tints secured.

My invention is for adapting one frame to the printing of the particular picture by allowing the divided back to be placed with the line of separation either lengthwise of or across the negative, the back being changeable in its position within the frame, so that the operator can place the back upon the paper and negative in whatever position may be the best for inspecting the same during the printing operation.

In the drawings, Figure 1 represents the back of the printing-frame. Fig. 2 is a section of the line $x\,x$, and Fig. 3 is a section at the line $y\,y$.

The frame is rectangular, and it is composed of the side pieces or rim $a\,a$ and the face $b$, against which the glass negative $c$ rests, near its edges, so that the light reaches the negative, as usual.

The removable back is made of the two pieces or flaps, $e$ and $f$, united by hinges $h$, and each flap is provided with a bow-spring, $k$, connected by the pivot-screw $i$.

It will now be apparent that the frame is to be of a size adapted to one size of plate, whether it is quarter-size, half-size, imperial, or other negative; but the plate being oblong and the frame square it is necessary to provide means for keeping the plate in position. I therefore use the corner-pieces $l\,l$ within the frame, between which the glass negative is placed, and the corners of the movable back are notched to set between these corner-pieces, and if the operator desires the back $e\,f$ to be in the position shown by full lines with the division between $e$ and $f$ lengthwise of the plate, the back is placed accordingly within the frames and the ends of the springs turned beneath the buttons $r\,r$, and the printing is proceeded with, as usual, and the picture is examined from time to time from the top to the bottom; but if the operator concludes that the picture should be examined at either the top or the bottom, then the back is to be placed into the frame $a\,a$, as shown by the dotted lines, with the ends of the springs beneath the buttons $s\,s$, so that the division between the flaps $e\,f$ will be across the middle of the plate, in the direction of its narrow measurement.

If two or more pictures are upon one plate the present improvement gives great facilities for the examination of either of the pictures.

I claim as my invention—

The combination, in a photographic-printing frame, of a square rim, $a$, having corner-pieces $l\,l$, with a two-part back and springs, and the two sets of buttons $r\,r$ and $s\,s$ upon the rim $a$, for the purposes and as set forth.

Signed by me this 3d day of February, A. D. 1881.

ABIATHAR H. ATWOOD.

Witnesses:
B. H. MARTIN,
BENJAMIN P. FINNELL.